United States Patent [19]

Opower

[11] Patent Number: 4,961,201
[45] Date of Patent: Oct. 2, 1990

[54] WAVEGUIDE CONFIGURATION

[75] Inventor: Hans Opower, Krailling, Fed. Rep. of Germany

[73] Assignee: Deutsche Forschungsanstalt fuer Luft- und Raumfahrt, Fed. Rep. of Germany

[21] Appl. No.: 399,029

[22] Filed: Aug. 24, 1989

[30] Foreign Application Priority Data

Aug. 26, 1988 [DE] Fed. Rep. of Germany ........ 3828951

[51] Int. Cl.$^5$ ................................................ H01S 3/08
[52] U.S. Cl. ........................................ 372/94; 372/64
[58] Field of Search .................... 372/64, 92, 94, 95

[56] References Cited

U.S. PATENT DOCUMENTS

| | | | |
|---|---|---|---|
| 3,379,998 | 4/1968 | Soules et al. | 331/94.5 |
| 4,439,860 | 3/1984 | Kurnit | 372/64 |
| 4,719,639 | 1/1988 | Tulip | 372/66 |

FOREIGN PATENT DOCUMENTS

| | | |
|---|---|---|
| 0292277 | 5/1988 | European Pat. Off. . |
| 2608830 | 9/1977 | Fed. Rep. of Germany . |
| 3003167 | 8/1982 | Fed. Rep. of Germany . |
| 2735299 | 8/1986 | Fed. Rep. of Germany . |
| 8102955 | 10/1981 | PCT Int'l Appl. . |

OTHER PUBLICATIONS

Elsa Garmire et al, "Flexible Infrared Waeguides for High-Power Transmission", *IEEE Journal of Quantum Electronics*, vol. QE-16, No. 1, Jan. 1980, pp. 23-32.

Primary Examiner—James W. Davie
Attorney, Agent, or Firm—Barry R. Lipsitz

[57] ABSTRACT

In order to improve a waveguide configuration for high-frequency-excited, diffusion-cooled gas laser system comprising a waveguide carrier with a cavity closed like a ring in an azimuthal direction in relation to a longitudinal axis and extending in the direction of said longitudinal axis, and a waveguide for guidance of a laser beam along an optical axis, the waveguide being arranged in the cavity and formed by waveguide wall surfaces disposed at a constant spacing from one another, the width of the waveguide wall surfaces transversely to the lengthwise extent of the waveguide in the direction of the optical axis being a multiple of their spacing from one another, and the waveguide wall surfaces enclosing a discharge space between them, such that with a waveguide geometry which is as expedient as possible, i.e., not too large a width, it is still easy to handle and can be operated in a single mode, it is proposed that the waveguide be arranged in the cavity such that its lengthwise extent includes an angle of ≦30 degrees with the azimuthal direction.

29 Claims, 7 Drawing Sheets

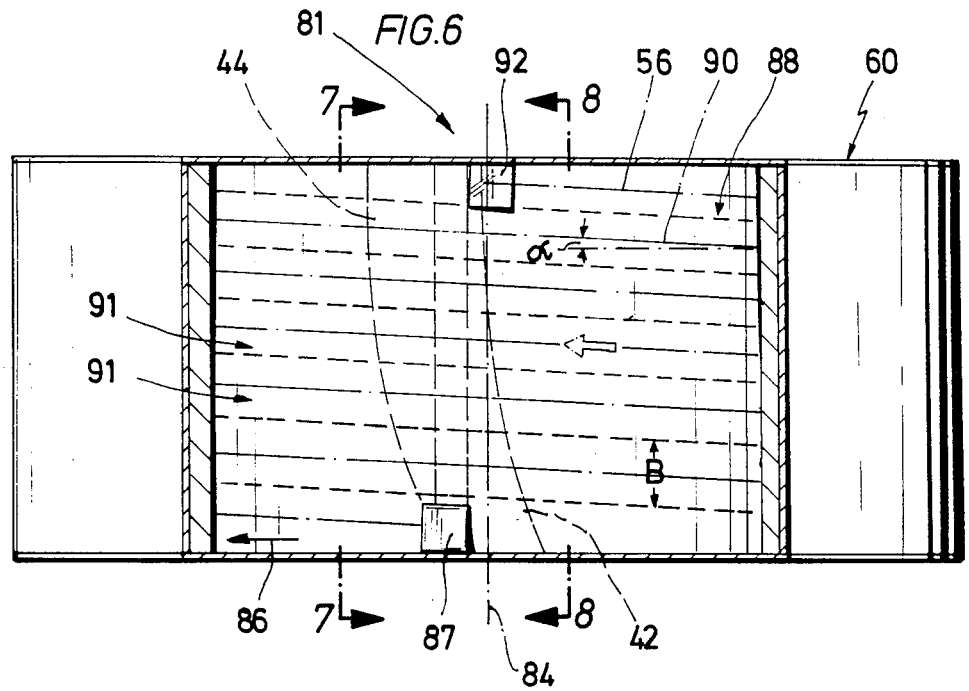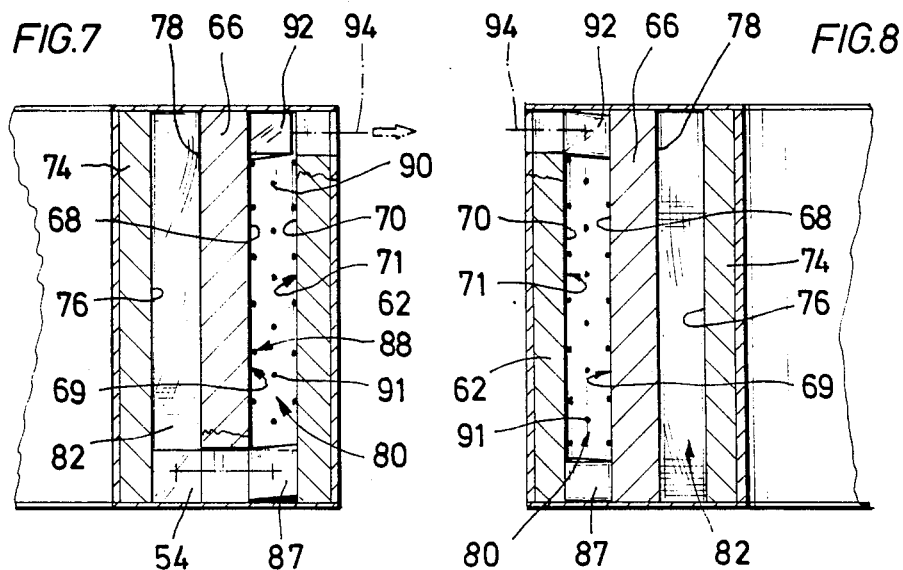

WAVEGUIDE CONFIGURATION

BACKGROUND OF THE INVENTION

P The invention relates to a waveguide configuration for a high-frequency-excited, diffusion-cooled gas laser system comprising a waveguide carrier with a cavity closed like a ring in an azimuthal direction in relation to a longitudinal axis and extending in the direction of said longitudinal axis, and a waveguide for guidance of a laser beam along an optical axis, the waveguide being arranged in the cavity and formed by waveguide wall surfaces disposed at a constant spacing from one another, the width of the waveguide wall surfaces transversely to the lengthwise extent of the waveguide in the direction of the optical axis being a multiple of their spacing from one another, and the waveguide wall surfaces enclosing a discharge space between them.

Electrically excited lasers are known from German Patents 2 608 830 and 2 735 299. Herein, the discharge space is enclosed between the wall surfaces of a waveguide. These wall surfaces of the waveguide are circumferential surfaces of two concentric cylinders. The waveguide extends lengthwise in the direction of a cylinder axis and so mirrors of a resonator are arranged at both end faces of the cylindrical waveguide.

Such a waveguide configuration has the disadvantage that, as a rule, a number of optically incoherent laser regions occur which, in particular, are uncoupled from one another transversely to the optical axis, i.e., in the azimuthal direction, so a single laser mode, as required for expedient use of such a laser, is not available. On the other hand, with such high-frequency-excited, diffusion-cooled gas lasers, possibilities are always being sought for making the waveguide wall surfaces as large as possible in order to have a discharge space volume which is as large as possible, as there are only slight variation possibilities as far as the spacing between the waveguide wall surfaces is concerned.

Enlargement of the waveguide surfaces in all conceivable directions, which, in principle, is possible, also creates problems, as either radiation can occur transversely to the lengthwise extent of the waveguide, resulting in undesired losses, or the waveguide configuration becomes very long and is, therefore, hard to handle in practical application.

SUMMARY OF THE INVENTION

The object underlying the invention is, therefore, to improve a waveguide configuration of the generic kind such that with a waveguide geometry which is as expedient as possible, i.e., not too large a width, it is still easy to handle and can be operated in a single mode.

This object is accomplished in a waveguide configuration of the kind described at the beginning, in accordance with the invention, in that the waveguide is arranged in the cavity such that its lengthwise extent includes an angle of $\leq 30$ degrees with the azimuthal direction.

Accordingly, the gist of the present invention is that, in contrast with the prior art, the lengthwise extent of the waveguide is not to be selected such that it runs parallel to the longitudinal axis or cylinder axis, but such that it runs, as far as possible, substantially in the azimuthal direction. This means that, in the invention, the optical axis also runs in the azimuthal direction and therefore separately, for example along a circular path or a helical path.

It is even more advantageous for the lengthwise extent to include an angle of $\leq 15$ degrees with the azimuthal direction, with values of this angle of $\leq 5$ degrees being particularly preferred.

In an embodiment which, despite its simple design, is expedient, the lengthwise extent of the waveguide is substantially parallel to the azimuthal direction.

Alternatively, it has proven advantageous, particularly when a waveguide with not too large a width is chosen, for the waveguide to wind in helical configuration in the direction of the longitudinal axis. On the one hand, this enables manufacture of a waveguide with a mode which is controllable by the width of the waveguide and with a very large length. On the other hand, the helical winding ensures that the inventive waveguide configuration remains easy to handle.

In order to make optimum use of the space in such a helically wound waveguide, it is expedient for successive windings of the waveguide to lie with facing side edges close together, with, as the case may be, minimal spacing between the side edges. However, optimal use of the space is made when the successive windings of the waveguide abut on one another with their facing side edges.

As far as the design of the cavity is concerned, all conceivable shapes are possible. It is, for example, possible for the cavity to be designed in the form of the lateral area of a cone or a conical frustum of finite thickness. As far as manufacturing techniques are concerned, it has, however, proven expedient for the cavity to be a cylinder-like ring space, i.e., for the cavity to be delimited by lateral surfaces of a cylinder coaxial with the longitudinal axis.

Regarding the cross-section of the cavity, again all possible shapes are conceivable. It is, for example, feasible for the ring space to be ellipsoid-like. From the point of view of manufacturing techniques, it is, however, particularly advantageous for the cavity to be a circular-cylindrical ring space, as this can be manufactured easily and with a high degree of precision and, on the other hand, also offers a high measure of stability, which is always desired for lasers.

Alternatively, it is also conceivable for the ring space to be a rectangular-cylindrical ring space, as such a ring space can also be produced in a simple and highly precise manner from the point of view of manufacturing techniques.

The waveguide wall surfaces, for their part, may be arranged on separate parts inserted in the cavity. However, it is advantageous, particularly as far as costs are concerned, for the wall surfaces of the cavity to form the waveguide wall surfaces so no additional parts are required for manufacture of the waveguide.

Regarding the dimensions of the waveguide, it is expedient, within the scope of a preferred embodiment of the present invention, for the waveguide to have a width which at most is equal to the extent of the wall surfaces in the direction of the longitudinal axis. In such a case, the lengthwise extent of the waveguide preferably runs substantially parallel to the azimuthal direction.

In other embodiments, particularly in ones where the waveguide winds in helical configuration in the cavity, provision is made for the waveguide to have a width which at most is equal to an integral fraction of the extent of the wall surfaces in the direction of the longitudinal axis.

For favorable high-frequency excitation of the discharge space enclosed by the waveguide wall surfaces, it has proven expedient for the waveguide to have electrodes extending over its entire lengthwise extent and width.

In a solution of the inventive waveguide configuration which is particularly expedient from a mechanical viewpoint, the waveguide comprises an outer part with a recess and an inner part insertable into this recess and connectable to the respective outer part, with the cavity being formed by a space between the inner part and the respective outer part.

In particular, in all of the embodiments wherein the waveguide wall surfaces are formed by the wall surfaces of the cavity, it is expedient for the course of the waveguide in the cavity to be defined by an optical element which clearly determines a distinct direction of the lengthwise extent of the waveguide, whether substantially parallel to the azimuthal direction or at an angle to the azimuthal direction so that, in particular also the danger of parasitic radiation transversely to the lengthwise direction of the waveguide is eliminated.

One possibility for design of these optical elements is for the optical element to be a mirror which predetermines a direction of propagation of a beam path and hence also the lengthwise extent of the waveguide.

Another preferred possibility, in particular, for helical arrangement of the waveguide in the cavity, is for the optical element to be an element which impedes propagation of laser radiation. In the simplest case, this can be grooves between the side edges of successive windings of the waveguide. Instead of the grooves, it is, however, also possible to use wall elements which prevent formation of parasitic radiation transversely to the lengthwise extent of the waveguide.

In all of the embodiments of the inventive waveguide configuration described so far, it was not explained in detail whether this waveguide configuration is to be employed in a gas laser system for use with a resonator or is merely to serve as an amplifier. Within the scope of one embodiment, provision is expediently made for the discharge space of the waveguide to be permeated at least partly by a resonator beam path so at least this part of the discharge space is available for generation of laser radiation by means of a resonator.

It is highly preferable for the resonator beam path to be that of an unstable resonator with a transverse extent running approximately parallel to the waveguide wall surfaces from a resonator axis to an exiting laser beam. The major advantage of such arrangement of a resonator beam path in the waveguide is that the waveguide can then be constructed with a relatively large width and yet there is essentially laser radiation that oscillates in one mode only.

A confocal resonator constitutes a particularly expedient resonator design. It is, furthermore, expedient for the resonator axis to extend parallel to the lengthwise extent of the waveguide.

Best use can be made of the width of the waveguide when the resonator beam path extends in the transverse direction at most over the width of the waveguide with, in particular, the resonator beam path having outer beams extending parallel to one another.

Particularly advantageous use of the width of the waveguide is possible when the resonator is designed as a resonator symmetrical with respect to the resonator axis.

This resonator design merely has the disadvantage that two laser beams exit from the resonator and have to be joined by a following optical system. If such an optical system is not desired, it is advantageous for the resonator to be constructed as half of a resonator symmetrical with respect to the resonator axis.

If the waveguide is to be used fully for generation of laser beams by means of a resonator, it is expedient for the waveguide to have mirrors of the resonator provided at both ends thereof.

As mentioned previously, the inventive waveguide configuration is not exclusively suited to serve as laser in combination with a resonator. On the contrary, it is similarly conceivable for at least part of the discharge space of the waveguide to be permeated by an amplifier beam path of a laser amplifier, i.e., for the inventive waveguide configuration to serve either with part of the discharge space or with the entire discharge space as laser amplifier, in which case, a laser beam has then to be coupled-in in this part of the discharge space.

Here, too, in adaptation to the geometrical shape of the waveguide, it has proven expedient for the amplifier beam path to have a transverse range extending transversely to an incoming laser beam.

Alternatively, it is, however, also readily possible, within the scope of a further embodiment, for a laser beam coupled into the waveguide to pass through the waveguide along its lengthwise extent, i.e., the width of the waveguide is chosen so as to merely correspond substantially to the width of the laser beam and the area required for generation of the desired amplification is obtained by this waveguide winding in helical configuration in the direction of the longitudinal axis.

In all embodiments in which a laser amplifier is combined with the waveguide, it is expedient for the laser amplifier to have an optical axis extending parallel to the lengthwise extent of the waveguide.

BRIEF DESCRIPTION OF THE DRAWINGS

Further features and advantages of the inventive waveguide configuration are set forth in the following description and the appended drawings of several embodiments. The drawings show:

FIG. 6: a section taken along line 6—6 in FIG. 5;
FIG. 7: a section taken along line 7—7 in FIG. 6;
FIG. 8: a section taken along line 8—8 in FIG. 6.

DETAILED DESCRIPTION OF THE INVENTION

Figure 1:
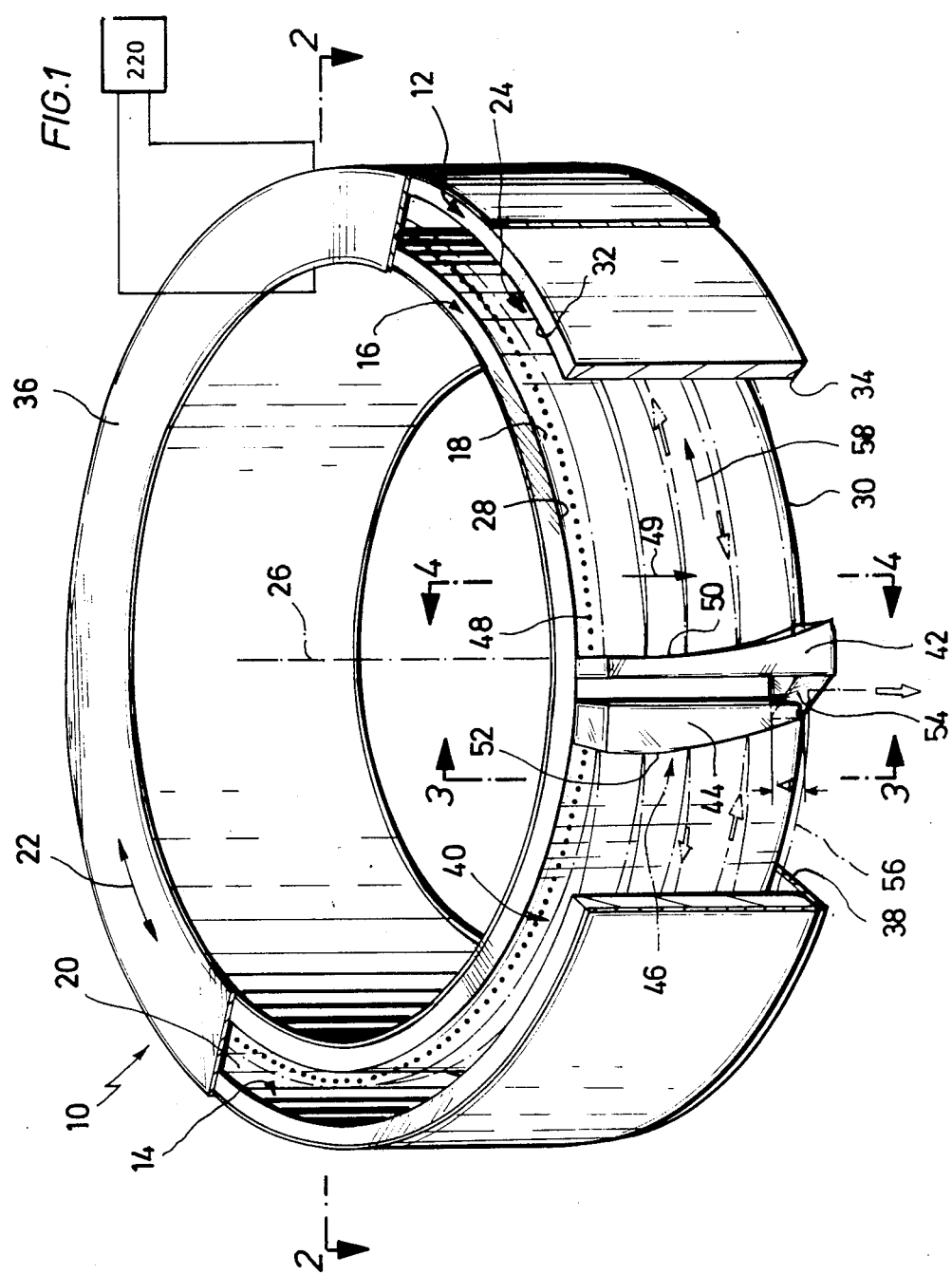
FIG. 1: a perspective view of a first embodiment of an inventive waveguide configuration.
Figure 2:
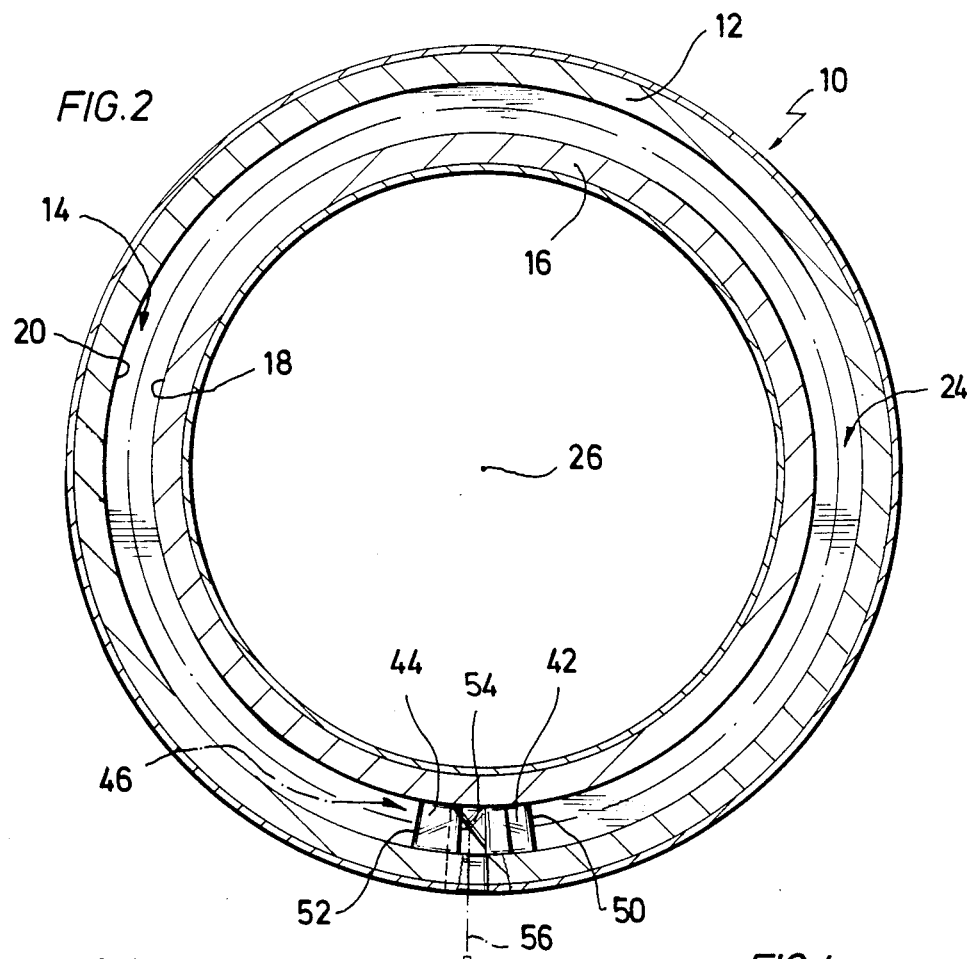
FIG. 2: a section taken along line 2—2 in FIG. 1.
Figure 3:
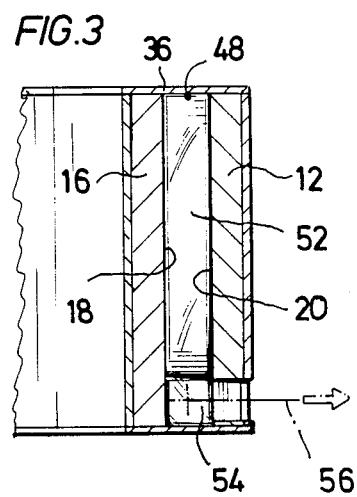
FIG. 3: a section taken along line 3—3 in FIG. 1.
Figure 4:
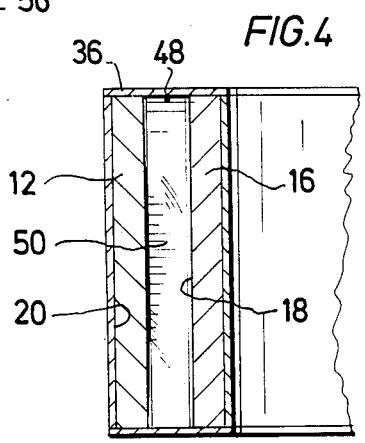
FIG. 4: a section taken along line 4—4 in FIG. 1.
Figure 5:
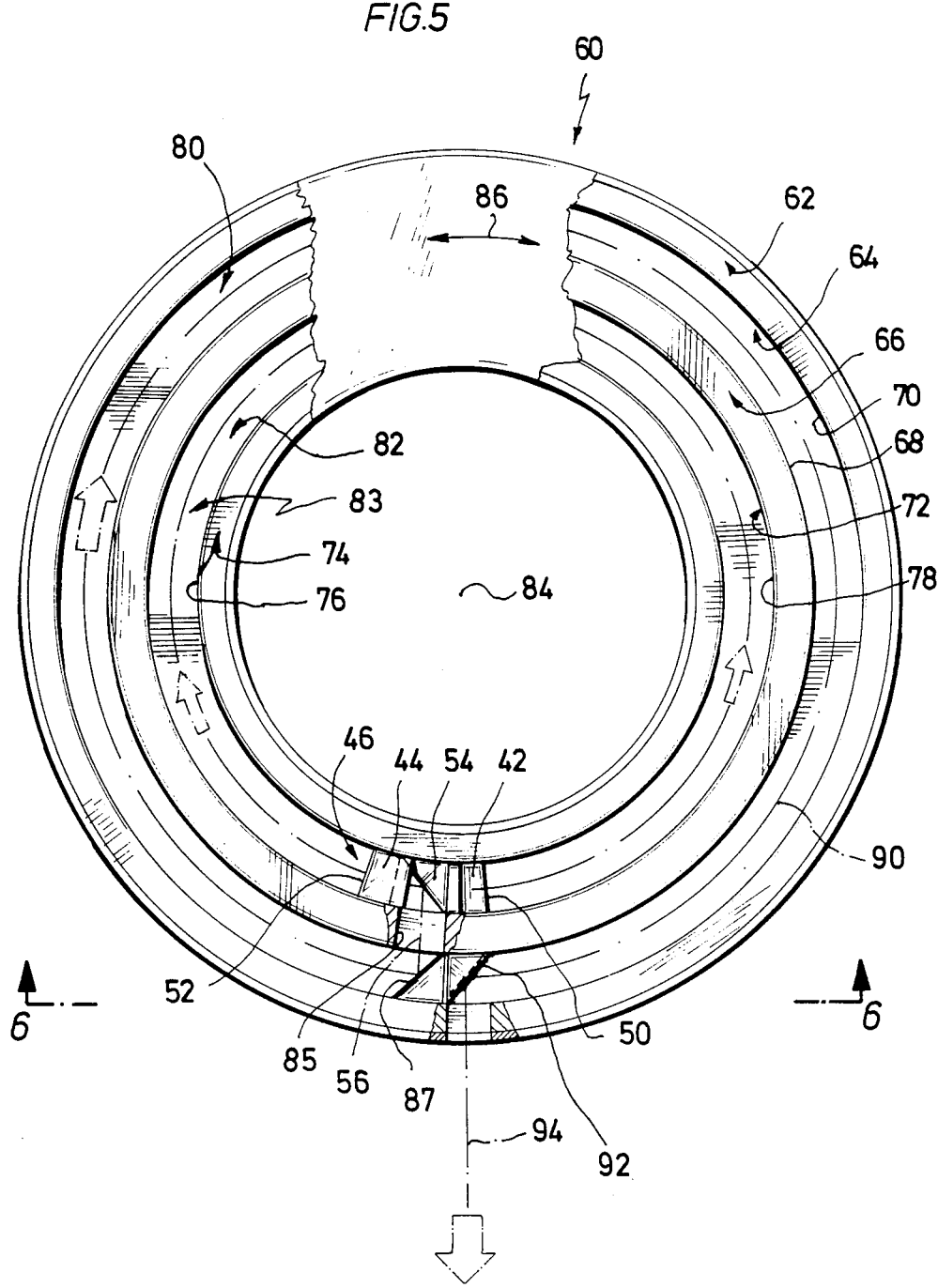
FIG. 5: a partly broken-open plan view of a second embodiment of the inventive waveguide configuration.
Figure 9:
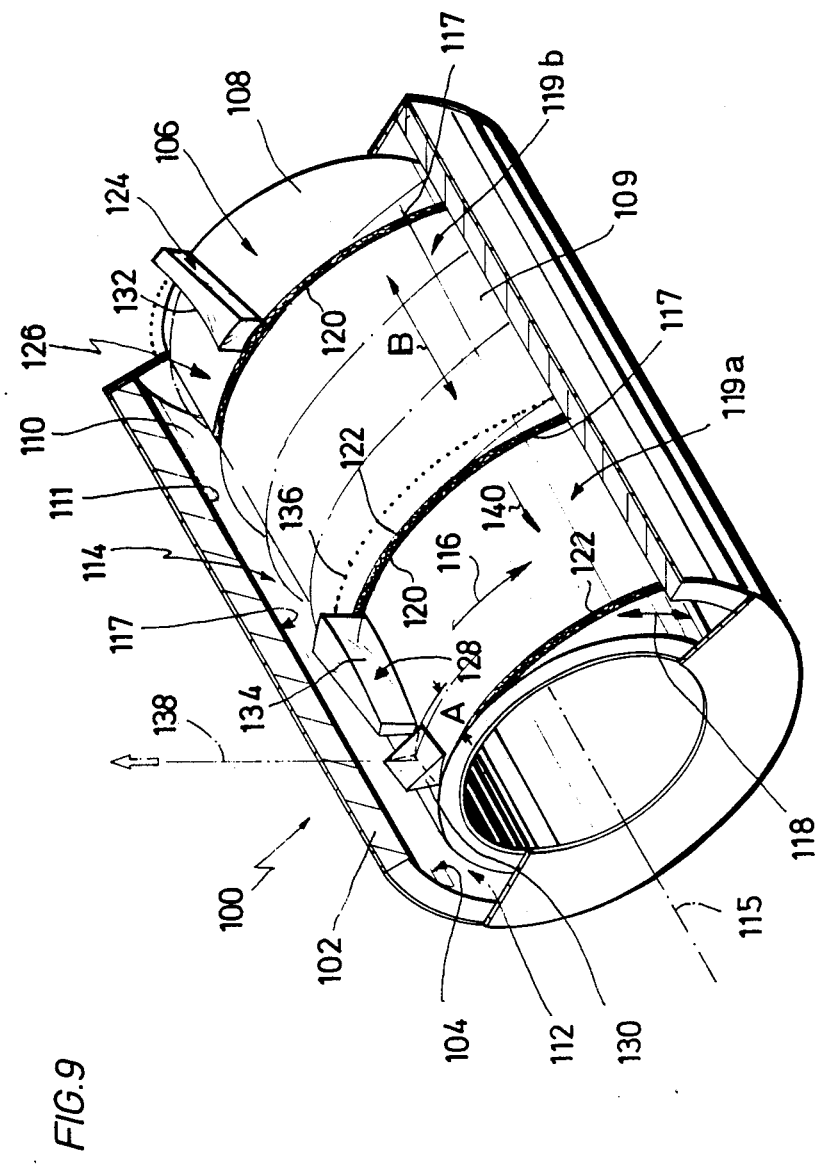
FIG. 9: a partly broken-open perspective view of a third embodiment of an inventive waveguide configuration.

A first embodiment of the inventive waveguide configuration, illustrated in FIGS. 1 to 4, comprises a waveguide carrier designated in its entirety 10 and having an outer part 12 with an inner circular-cylindrical recess 14 in which an inner part 16 with a circular-cylindrical circumferential surface 18 is inserted such that the circumferential surface 18 extends at a constant spacing from a circular-cylindrical inner surface 20 of recess 14. A ring-like cavity 24 which is closed in an azimuthal or circumferential direction 22 and extends in the direction of a longitudinal axis 26 of the cylindrical recess 14 extending perpendicularly to the circumferential direction 22 is thereby formed between the circumferential surface 18 and the inner surface 20.

Both inner part 16 and outer part 12 are designed such that their extent parallel to the longitudinal axis 26, i.e., their width is identical and, consequently, cavity 24 extends between side edges 28 and 30 located on either side of inner part 16 and side edges 32 and 34 located on either side of outer part 12.

The inner part 16 is held on the outer part 12 by side walls 36 and 38, respectively, covering outer part 12 and inner part 16 in the region of their side edges 28 and 32, and 30 and 34, respectively.

The inner surface 20 of outer part 12 and the circumferential surface 18 of inner part 16 are of optically reflecting design and constitute waveguide wall surfaces.

This waveguide 40 is closed off at its ends by two mirrors 42 and 44 which, in turn, form a resonator 46 extending through the waveguide 40. This resonator 46 is designed as an unstable resonator forming half of a resonator which is symmetrical with respect to a resonator axis 48. The resonator axis 48 which, as optical axis of the resonator 46 stands at its points of intersection with mirror surfaces 50 and 52 of mirrors 42 and 44 perpendicularly on these, extends at the level of side edges 28 and 32 of inner part 16 and outer part 12. Starting from this resonator axis 48, a beam path of resonator 46 extends in the transverse direction 49 parallel to the longitudinal axis 26 of the waveguide carrier 10 as far as to the level of side edges 30 and 34 of inner part 16 and outer part 12, with individual beams of this beam path being oriented substantially in the circumferential direction 22 or in the opposite direction and including an acute angle with this circumferential direction 22 as the distance from the resonator axis 48 increases.

The mirror 42 of resonator 46 is designed as a concave mirror and extends over the entire width of cavity 24 from side edges 28 and 32 to side edges 30 and 34. The mirror 44, on the other hand, is designed as a convex mirror of the resonator 46 and extends from side edges 28 and 32 in the direction of side edges 30 and 34 but ends at a distance A from these. This remaining region of the waveguide 40 which is not closed off by the convex mirror 44 is provided with a coupling-out mirror 54 for reflecting outwardly in the radial direction in relation to the longitudinal axis 26 a laser beam 56 impinging on the coupling-out mirror 54 in the circumferential direction 22 and hence coupling it out of the resonator 46.

The mirrors 42 and 44 are preferably of such dimensions that they fit into the cavity 24 and stand with their mirror surfaces 50 and 52, respectively, perpendicularly on the circumferential surface 18 and the inner surface Resonator 46 is a curved one, with a resonator axis 48 extending parallel to the lengthwise extent 58 of the waveguide 40 following the circumferential direction 22, and the mirror surfaces 50 and 52, in relation to a resonator with a straight lengthwise extent 58, are of confocal and cylindrical design.

Hence the first embodiment of the inventive waveguide configuration constitutes a laser system wherein the resonator 46 is inserted in the annular, closed cavity 24 and is curved in conformance with it.

In a second embodiment of an inventive waveguide configuration, a waveguide carrier designated in its entirety 60 comprises an outer part 62 with a circular-cylindrical recess 64 in which a first inner part 66 is inserted such that a first circumferential surface 68 thereof extends at a constant spacing from a first inner surface 70 of the recess 64.

This first inner part 66, in turn, comprises a cylindrical recess 72 in which a second inner part 74 is inserted such that a second circumferential surface 76 thereof extends at a constant spacing from a second inner surface 78 of the recess 72. Hence the waveguide carrier 60 comprises a first annular cavity 80 located between the first inner surface 70 and the first circumferential surface 68 as well as a second annular cavity 82 located between the second inner surface 78 and the second circumferential surface 76.

Both cavities 80 and 82 extend in the direction of the longitudinal axis 84, serving as cylinder axis, perpendicularly to an azimuthal or circumferential direction 86 along which these cavities 80, 82 extend in ring-shaped, closed configuration.

The second cavity 82 forms with the circumferential surface 76 and the inner surface 78 a first waveguide 83 in which the resonator 46, described hereinabove in conjunction with the first embodiment, is arranged. For a description thereof, reference is, therefore, made to the statements on the first embodiment. The laser beam 56 is reflected by this first resonator 46 through an opening 85 into the first cavity 80 where it is deflected by a deflecting mirror 87 into the circumferential direction 86 again.

In contrast with the second cavity 82, a resonator is not provided in the first cavity 80, but instead a laser amplifier 81 by means of which the laser beam 56 is successively amplified as it passes through the cavity without being reflected back and forth. Here, too, the first inner surface 70 and the first circumferential surface 68 form waveguide wall surfaces 69 and 71, respectively, of a second waveguide 88 with a constant width B. The lengthwise extent 90 of the waveguide 88 is of helical configuration in the first cavity 80 and forms with the circumferential direction 86 an angle which represents the angle of inclination of this helix. After several helical windings 91, the laser beam 56 passing through this waveguide 88 coaxially with the lengthwise extent 90, is reflected radially outwardly with respect to the longitudinal axis 84 by a deflecting mirror 92 and exits from the waveguide configuration as amplifier laser beam 94.

The width B of the waveguide 88 is to be selected such that it is larger than or equal to the width of the laser beam 56 which is equal to the spacing A of the convex mirror 44 from the side edges 30 and 34 of the first waveguide 83.

As shown in FIG. 6, the windings 91 of the second waveguide 88 lie so close together that they touch each other at the sides.

Thus, in this second embodiment, cavity 82 is available with its entire width for generation of the laser beam 56 by means of the unstable resonator, whereas in cavity 80, a narrower waveguide 88 corresponding approximately to the width B of the laser beam 56 winds in helical configuration over the width of cavity 80.

In a third embodiment of an inventive waveguide configuration, a waveguide carrier 100 similarly comprises an outer part 102 having a cylindrical recess 104 in which an inner part 106 is inserted such that a circumferential surface 108 thereof extends at a constant spacing from an inner surface 110 of the cylindrical recess 104.

A thus formed annular cavity 112 extends in the direction of a longitudinal axis 115 of the waveguide carrier 100. The longitudinal axis 115 is arranged coaxially with the cylinder axis of the cylindrical recess 104. The circumferential surface 108 and the inner surface 110 thereby form a waveguide designated in its entirety 114 with waveguide wall surfaces 109 and 111. The lengthwise extent 116 of the waveguide 114 is of helical configuration in the cavity 112 and similarly includes an angle $\eta$ with a circumferential direction 118. The helical waveguide 114 thereby extends in two windings 119a, b in the cavity 112, with the angle $\eta$ being selected such that the two side edges 120 and 122 of the waveguide lie close together in the case of successive windings. Between these side edges lying close together, a nonreflecting layer 117 is disposed on the circumferential surface 108 and the inner surface 110 and so the reflecting waveguide wall surfaces 109, 111 differ distinctly from this layer 117.

The waveguide 114 is closed off at its ends by mirrors 124 and 128, both being designed as mirrors of an unstable resonator. Mirror 124 is of concave, mirror 128 of convex design. Furthermore, mirror 124 extends over the entire width B of the waveguide 114 from side edge 120 to side edge 122, whereas mirror 128 extends from side edge 120 in the direction towards side edge 122 but ends at a distance A from it. A coupling-out mirror 130 is provided between mirror 128 and side edge 122.

Both mirrors 124 and 128 are designed as mirrors of a half, symmetrical resonator which is confocal in relation to a straight lengthwise extent 116. The cylindrical mirror surfaces 132, 134 of these mirrors 124 and 128 stand perpendicularly on the circumferential surface 108 and the inner surface 110.

A resonator axis 136 of the resonator on which the mirror surfaces 132 and 134 stand perpendicularly at the point of intersection with it, extends, in this resonator 136, at the level of side edge 120 of the waveguide 114 and hence represents the optical axis of this resonator.

A laser beam 138 created in the region of the resonator axis 136 is reflected back and forth between mirrors 124 and 128 until it has travelled so far from side edge 120 in the transverse direction 140 to side edge 122 that it impinges on the coupling-out mirror 130 and is reflected outwardly by it in a radial direction with respect to the longitudinal axis 115.

Figure 10:
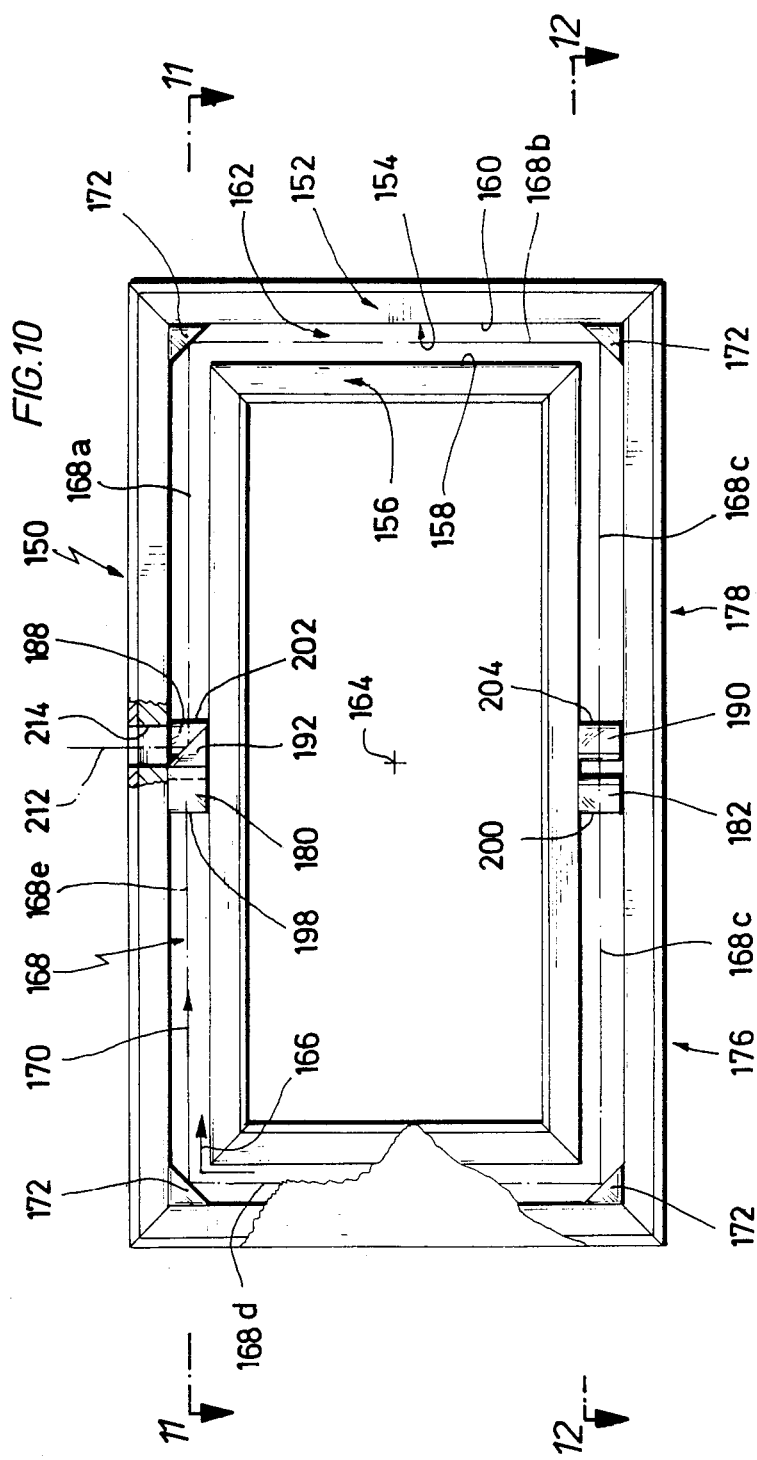
FIG. 10: a partly broken-open plan view of a fourth embodiment of the inventive waveguide con figuration.
Figure 11:
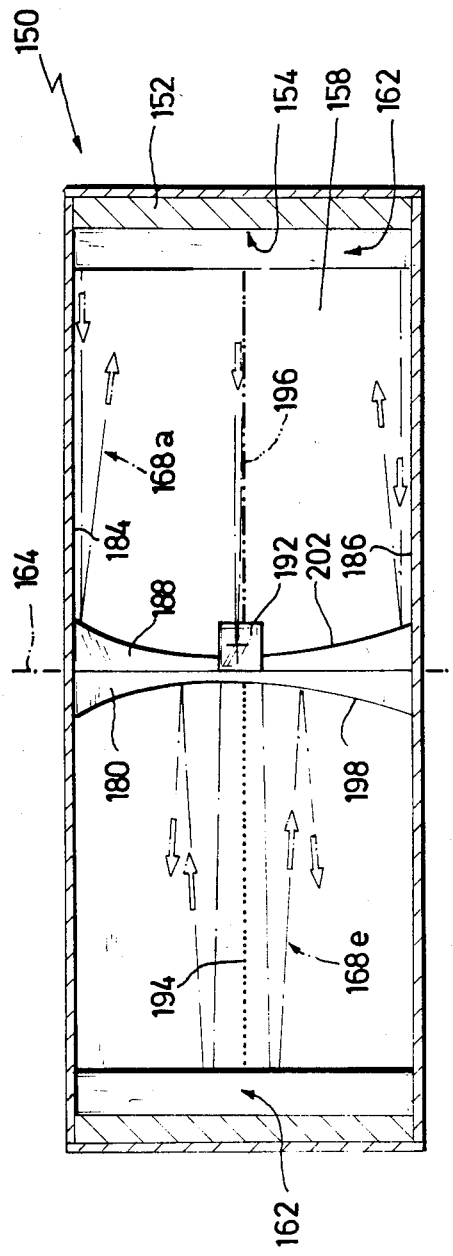
FIG. 11: a section taken along line 11—11 in FIG. 10.
Figure 12:
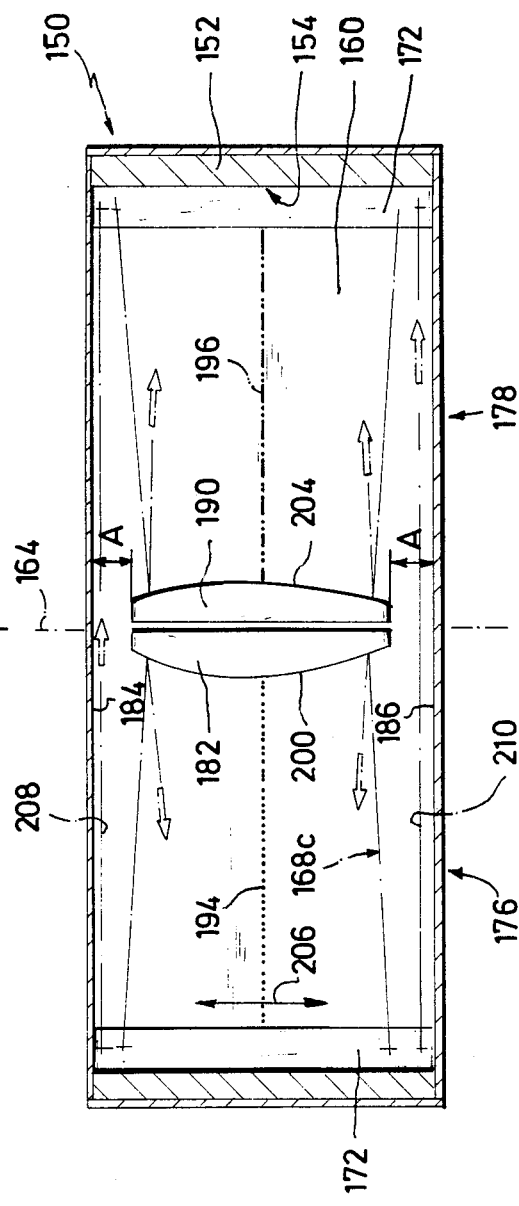
FIG. 12: a section taken along line 12—12 in FIG. 10.

A fourth embodiment of the inventive waveguide configuration, illustrated in FIGS. 10 to 12, comprises a waveguide carrier 150 having an outer part 152 with an inner recess 154 of rectangular cross-section. Inserted in this outer part 152 is an inner part 156 having an outer rectangular cross-section and an outer surface 158 extending at a constant spacing from an inner surface 160 of the recess 154. Hence there extends between the outer surface 158 and the inner surface 160, in the direction of a longitudinal axis 164 of the waveguide carrier, a cavity 162 which is closed like a ring in a circumferential direction 166 in relation to the longitudinal axis 164.

The outer surface 158 and the inner surface 160 thereby form waveguide wall surfaces of a waveguide designated in its entirety 168 with a lengthwise extent 170 parallel to the circumferential direction 166. The width of the waveguide corresponds to the extent of the cavity 162 in the direction of the longitudinal axis 164. The waveguide 168 is comprised of a total of four straight oriented sections designated 168a, 168b, 168c, 168d and 168e. Arranged between the straight oriented sections 168a and 168b, 168b and 168c, 168c and 168d as well as 168d and 168e, respectively, is a deflecting mirror 172 which deflects the entire radiation guided by one waveguide section into the respective other waveguide section.

The waveguide 168 includes between the outer surface 158 and the inner surface 160 a discharge space which is partly permeated by a resonator beam path of a resonator 176 and partly by an amplifier beam path of an amplifier 178.

The resonator 176 is formed by a mirror 180 arranged in waveguide section 168e at an end opposed to waveguide section 168d and by a mirror 182 arranged approximately at the center of waveguide section 168c, mirror 180 being a concave mirror of an unstable resonator, while mirror 182 is a convex mirror of an unstable resonator. Mirror 180 extends over the entire width of the waveguide 168, while mirror 182, as shown in FIG. 12, ends at both sides at a distance A from both side edges 184, 186 of the waveguide 168.

The amplifier 178 also comprises a mirror 188 and a mirror 190, mirror 190 being arranged back to back with mirror 182. Mirror 190 is similarly of convex design and likewise ends at distance A from the side edges 184, 186 of the waveguide 168, while mirror 188 extends over the entire width of the waveguide 168 and is of concave design. In addition, a coupling-out mirror 192 is provided at the center of mirror 188.

An optical axis designated as resonator axis 194 extends halfway between the side edges 184 and 186 and is continued in waveguide section 168c in an optical axis 196 of the amplifier 178 which is arranged coaxially with the optical axis 194 and similarly extends halfway between the side edges 184 and 186.

Mirrors 180 and 182 of resonator 176 are designed as confocal mirrors, in relation to an elongated resonator, and their mirror surfaces 198 and 200 are cylindrical and both stand perpendicularly on the outer surface 158 and the inner surface 160.

Mirrors 188 and 190 with mirror surfaces 202 and 204 are designed in the same way. Mirror surfaces 202 and 204 have the same curvature as mirror surfaces 198 and 200 and exactly like mirror surfaces 198 and 200 are of cylindrical design.

In resonator 176, symmetrical with respect to resonator axis 194, outwardly travelling beams proceeding from resonator axis 194 are created due to reflection back and forth in the transverse direction 206 extending parallel to outer surfaces 158 and inner surfaces 160 and leave the resonator 176 as laser beams 208 and 210, thereby passing at the sides of mirrors 182 and 190 into the amplifier 178 where they are reflected again by mirror 188 onto mirror 190 and as a result of further increasing reflection in the transverse direction 206 travel to the optical axis 196. They thus impinge on the coupling-out mirror 192 which reflects an amplifier laser beam 212 outwardly in the radial direction with respect to the longitudinal axis 164 through an opening 214 in outer part 152.

The resonator 176 with mirrors 180 and 182 used in this embodiment can also be employed in cavity 82 of the second embodiment, in which case the resonator 176 fills out this cavity completely. Similarly to laser beam 56, laser beams 208 and 210 are to be directed by two mirrors 54 into cavity 80 where, similarly to laser beam 56, they are deflected by two mirrors 87. However, laser beams 208 and 210 do not extend in helical configuration in cavity 80 but are joined by amplifier 178 arranged with mirrors 188 and 190 in cavity 80 into an exiting laser beam 212 which is then deflected in the radial direction by mirror 192.

In all of the embodiments of the inventive waveguide configuration described above, a gas discharge is generated in cavities 24, 80, 82, 112 and 162 either by outer parts 12, 62, 102, 152 and inner parts 16, 66, 74, 106, 156 consisting of metal and being connected to a corresponding high-frequency generator 220, indicated in FIG. 1, for generation of frequencies in the MHz to several GHz-range, in particular in the range of from 80 to 400 MHz. Or, alternatively, the outer and inner parts may be dielectric and have on their sides facing towards cavities 24, 80, 82, 112 and 162 a metallic coating which, for its part, is then connected to the high-frequency generator.

CO or $CO_2$ are preferably used as laser gas. If $CO_2$ is used, then with additives of He, $N_2$ in the usual mixing ratios and preferably with a small proportion of Xe.

The present disclosure relates to the subject matter disclosed in German application No. P 38 28 951.2 of Aug. 26, 1988, the entire specification of which is incorporated herein by reference.

What is claimed is:

1. Waveguide configuration for a high-frequency-excited, diffusion-cooled gas laser system comprising a waveguide carrier with a cavity closed like a ring in an azimuthal direction in relation to a longitudinal axis and extending in the direction of said longitudinal axis, and a waveguide for guidance of a laser beam along an optical axis, said waveguide being arranged in said cavity and formed by waveguide wall surfaces disposed at a constant spacing from one another, the width of said waveguide wall surfaces transversely to the lengthwise extent of said waveguide in the direction of said optical axis being a multiple of their spacing from one another, and said waveguide wall surfaces enclosing a discharge space between them, characterized in that said waveguide (40, 83, 88, 114, 168) is arranged in said cavity such that its lengthwise extent (58, 90, 116, 170) includes an angle of $\leq 30$ degrees with said azimuthal direction (22, 86, 118, 166).

2. Waveguide configuration as defined in claim 1, characterized in that said lengthwise extent (58, 90, 116, 170) includes an angle of $\leq 15$ degrees with said azimuthal direction (22, 86, 118, 166).

3. Waveguide configuration as defined in claim 2, characterized in that said lengthwise extent (58, 90, 116, 170) includes an angle of $\leq 5$ degrees with said azimuthal direction (22, 86, 118, 166).

4. Waveguide configuration as defined in claim 3, characterized in that said lengthwise extent (58, 170) of said waveguide (40, 83, 168) is substantially parallel to said azimuthal direction (22, 86, 166).

5. Waveguide configuration as defined in claim 1, characterized in that said waveguide (88, 114) winds in helical configuration in the direction of said longitudinal axis (84, 115).

6. Waveguide configuration as defined in claim 5, characterized in that successive windings (91, 119) of said waveguide (88, 114) lie with their facing side edges (120, 122) close together.

7. Waveguide configuration as defined in claim 1, characterized in that said cavity (24, 80, 82, 112, 162) is a cylinder-like cavity.

8. Waveguide configuration as defined in claim 7, characterized in that the ring space (24, 80, 82, 112) is a circular-cylindrical ring space.

9. Waveguide configuration as defined in claim 7, characterized in that the ring space (162) is a rectangular-cylindrical ring space.

10. Waveguide configuration as defined in claim 1, characterized in that said cavity (24; 80, 82; 112; 162) forms with its wall surfaces said waveguide wall surfaces (16, 18; 69, 71; 109, 111; 158, 160).

11. Waveguide configuration as defined in claim 1, characterized in that said waveguide (40, 83, 88, 114, 168) has a width which at most is equal to the extent of said wall surfaces (16, 18; 68, 70; 76, 78; 108, 110; 158, 160) of said cavity (24, 80, 82, 112, 162) in the direction of said longitudinal axis (26, 84, 115, 164).

12. Waveguide configuration as defined in claim 1, characterized in that said waveguide (88, 114) has a width which at most is equal to an integral fraction of the extent of said wall surfaces (76, 78, 108, 110) of said cavity (82, 112) in the direction of said longitudinal axis (84, 115).

13. Waveguide configuration as defined in claim 1, characterized in that said waveguide (40, 83, 88, 114, 168) has electrodes extending over its entire lengthwise extent (58, 90, 116, 170) and width.

14. Waveguide configuration as defined in claim 1, characterized in that said waveguide carrier (10, 60, 100, 150) comprises an outer part (12, 62, 102, 152) with a recess (14, 64, 104, 154) and an inner part (16, 66, 74, 106, 156) insertable into this recess and connectable with said outer part, and in that said cavity (24, 80, 82, 112, 162) is formed by a space between said inner part and said respective outer part.

15. Waveguide configuration as defined in claim 1, characterized in that the course of said waveguide (88, 114) in said cavity (82, 112) is defined by an optical element (87; 117).

16. Waveguide configuration as defined in claim 15, characterized in that said optical element comprises a mirror (87) which predetermines a direction of propagation (116) of a beam path.

17. Waveguide configuration as defined in claim 15, characterized in that said optical element is an element (117) which impedes propagation of laser radiation.

18. Waveguide configuration as defined in claim 1, characterized in that at least part of the discharge space of said waveguide (40, 83, 88, 114, 168) is permeated by a resonator beam path.

19. Waveguide configuration as defined in claim 18, characterized in that said resonator beam path is that of an unstable resonator with a transverse extent (49, 140, 206) running approximately parallel to said waveguide wall surfaces (16, 18; 69, 71; 109, 111; 158, 160) from a resonator axis (48, 136, 194) to an exiting laser beam (56; 138; 208, 210).

20. Waveguide configuration as defined in claim 19, characterized in that said resonator is a confocal resonator.

21. Waveguide configuration as defined in claim 18, characterized in that said resonator axis (48, 136, 194) extends parallel to the lengthwise extent (58, 90, 116, 170) of said waveguide (40, 83, 88, 114, 168).

22. Waveguide configuration as defined in claim 19, characterized in that said resonator beam path extends in the transverse direction (49, 140, 206) at most over the width (B) of said waveguide (40, 83, 114, 168).

23. Waveguide configuration as defined in claim 18, characterized in that said resonator beam path comprises outer beams extending parallel to one another.

24. Waveguide configuration as defined in claim 19, characterized in that said resonator is designed as a resonator symmetrical with respect to said resonator axis (48, 136, 194).

25. Waveguide configuration as defined in claim 19, characterized in that said resonator is constructed as half of a resonator symmetrical with respect to said resonator axis (48, 136, 194).

26. Waveguide configuration as defined in claim 1, characterized in that at least part of the discharge space of said waveguide (88, 168) is permeated by an amplifier beam path of a laser amplifier (81, 178).

27. Waveguide configuration as defined in claim 26, characterized in that said amplifier beam path has a transverse extent (206) running transversely to an incoming laser beam (208, 210).

28. Waveguide configuration as defined in claim 26, characterized in that a laser beam (56) coupled into said waveguide passes through said waveguide (88) in the direction of its lengthwise extent (90).

29. Waveguide configuration as defined in claim 26, characterized in that said laser amplifier (81, 178) comprises an optical axis extending parallel to the lengthwise extent (90, 170) of said waveguide (88, 168).

* * * * *